United States Patent [19]

West et al.

[11] Patent Number: 4,916,270

[45] Date of Patent: Apr. 10, 1990

[54] MIG WELDER CUTTING HEAD ATTACHMENT

[75] Inventors: John C. West, Eagan; Terry A. Prentice, Bloomington, both of Minn.

[73] Assignee: Century Mfg. Co., Minneapolis, Minn.

[21] Appl. No.: 306,669

[22] Filed: Feb. 6, 1989

[51] Int. Cl.⁴ .............................................. B23K 9/00
[52] U.S. Cl. .................................... 219/70; 219/137.31
[58] Field of Search ................... 219/69.1, 70, 72, 74, 219/136, 137.31, 137.42

[56] References Cited

U.S. PATENT DOCUMENTS

| | | | |
|---|---|---|---|
| 1,519,582 | 12/1924 | Harris . | |
| 2,089,014 | 8/1937 | Bucknam et al. | 113/59 |
| 2,952,766 | 9/1960 | Craig et al. | 219/137.42 |
| 3,470,345 | 9/1969 | Vaillancourt | 219/70 |
| 3,646,306 | 2/1972 | Olds | 219/70 |
| 4,049,943 | 9/1977 | Pratt | 219/136 |
| 4,142,086 | 2/1979 | Rotillo | 219/136 |
| 4,731,518 | 3/1988 | Parmelee et al. | 219/137.42 |

FOREIGN PATENT DOCUMENTS 136547 10/1979 Japan ....................... 219/70

*Primary Examiner*—A. D. Pellinen
*Assistant Examiner*—Geoffrey S. Evans
*Attorney, Agent, or Firm*—Leo Gregory

[57] ABSTRACT

A metal cutting nozzle attachment for an inert gas welder converting the welder into a metal cutting apparatus having the welding flux core wire energized to become the cutting element and the nozzle being arranged to cause a sufficient increase in the velocity of an air stream passing therethrough to clear away the molten or cut metal.

1 Claim, 2 Drawing Sheets

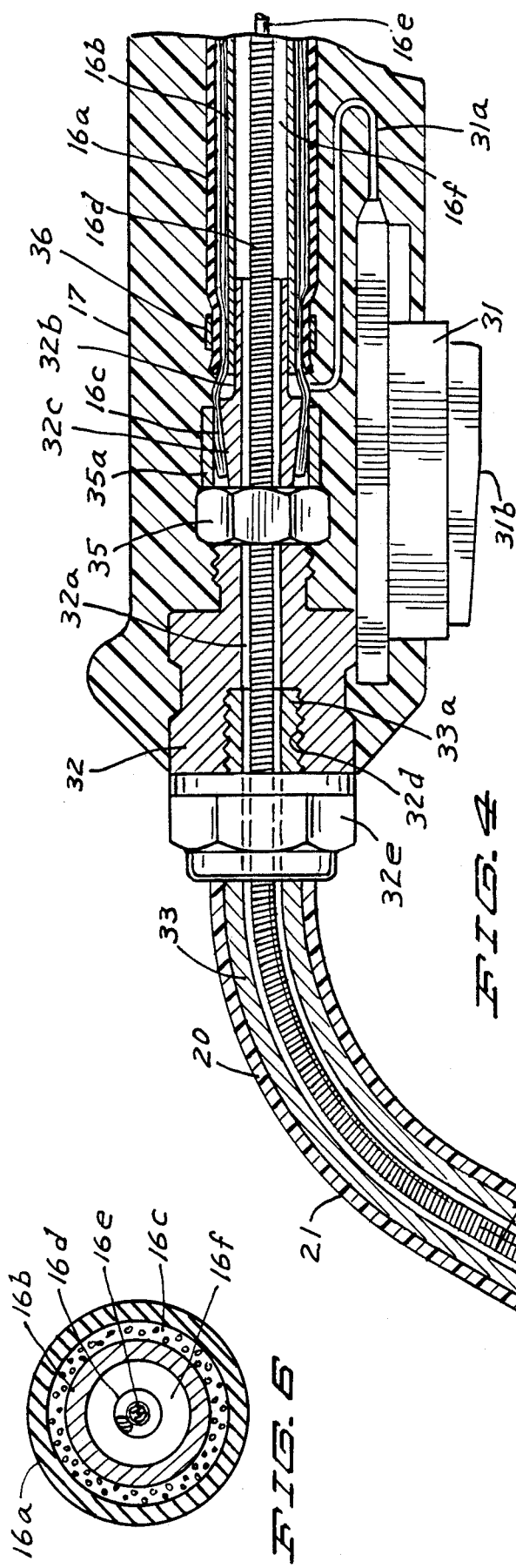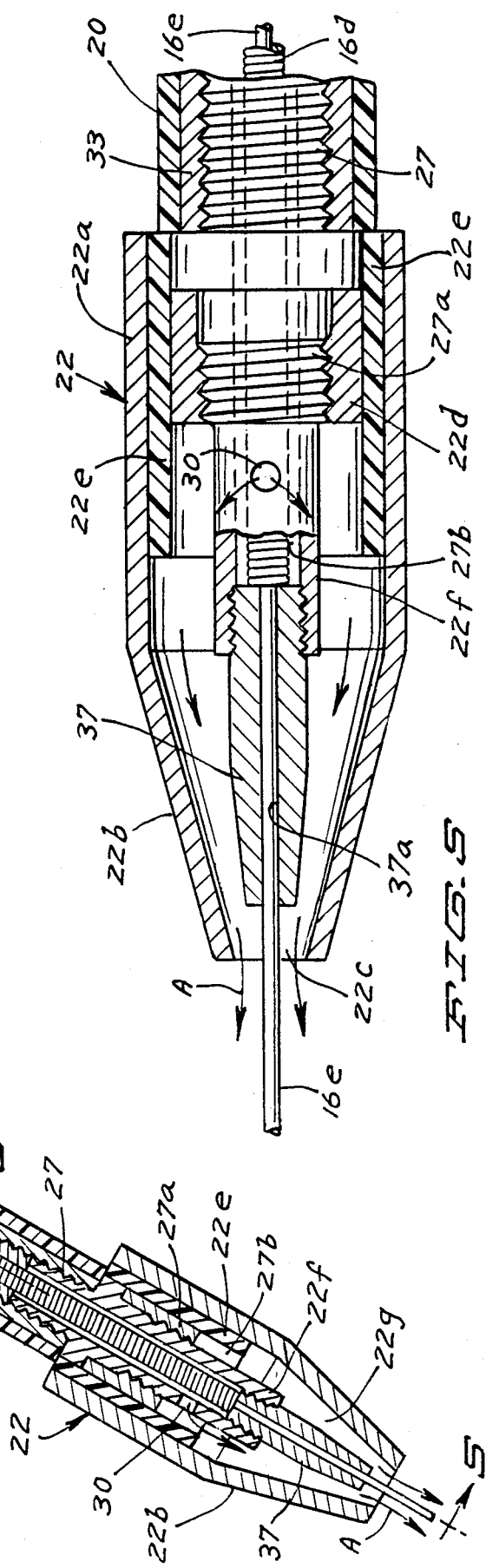

4,916,270

MIG WELDER CUTTING HEAD ATTACHMENT

BACKGROUND OF THE INVENTION

1. Field of Invention

This invention relates to an inert gas welder conversion into a metal cutting apparatus.

2. Brief Description of the Previous Art

The invention herein is in an attachment for a mig or inert gas welder replacing the conventional nozzle of the welder hose with a nozzle which adapts the welder to become a metal cutting apparatus and increases the velocity of air passing therethrough sufficiently to blow away the cut metal residue.

A conventional welder does not have the capability of cutting metal and conversely a like metal cutting apparatus is not adapted for welding purposes.

It is a very helpful convenience for a welding apparatus to be adaptable for use as both a welding and a metal cutting apparatus.

Known in the art is the U.S. Pat. No. 3,470,345 to R. M. Vaillancourt which discloses an arc welder provided with an air stream whereby the electrode gouges the metal. Also in U.S. Pat. No. 3,646,306 to E. W. Olds there is disclosed an arc welder in which an electrode gouges metal and gas of sufficient velocity is provided to blow away the molten metal.

It is desirable to provide an inert gas welder with a nozzle which in connection with the conventional flux core wire used for welding can be used to cut metal, not gouge it, and the nozzle increases the velocity of an air stream to blow away the flashings of the cut metal.

SUMMARY OF THE INVENTION

It is an object of this invention to provide conveniently the dual capability of both welding and metal cutting in an inert gas welder.

It is a further object herein to provide an attachment in the form of a nozzle to substitute for the conventional nozzle of an inert gas welder and provide the welder with the capability of both welding and metal cutting using conventional flux core wire.

It is also an object of this invention to provide an attachment which may conveniently and economically replace a conventional nozzle and provide for energizing a conventional core wire to become a metal cutting element and for accelerating the passage of an air stream therethrough to blow away the cut molten metal.

These and other objects and advantages of the invention will be set forth in the following description made in connection with the accompanying drawings in which like reference characters refer to similar parts throughout the several views.

BRIEF DESCRIPTION OF THE DRAWINGS

FIG. 4 is a view similar to FIG. 3 on an enlarged scale and shown in vertical longitudinal section;

FIG. 5 is a view on an enlarged scale in vertical section showing the nozzle portion of the view in FIG. 4; and FIG. 6 is a view in vertical cross section on an enlarged scale taken on line 6—6 of FIG. 2.

DESCRIPTION OF A PREFERRED EMBODIMENT

Figure 1:
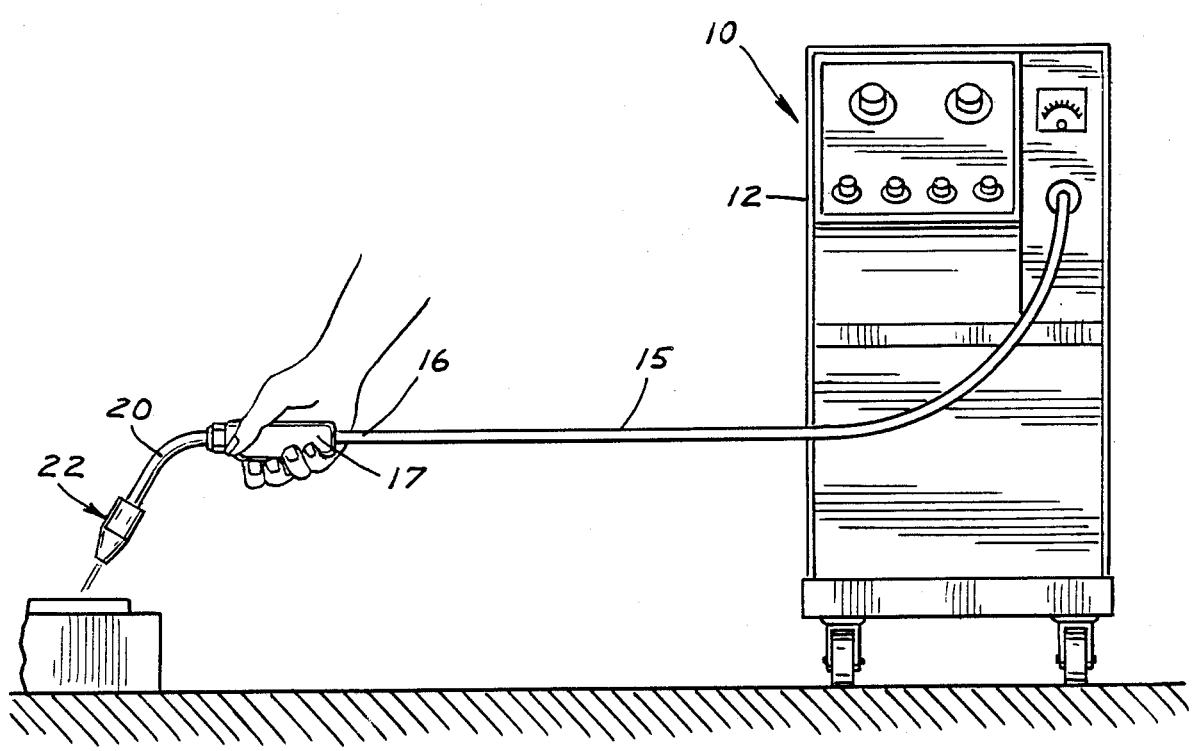
FIG. 1 is a view in front elevation showing the device in operation.
Figure 2:
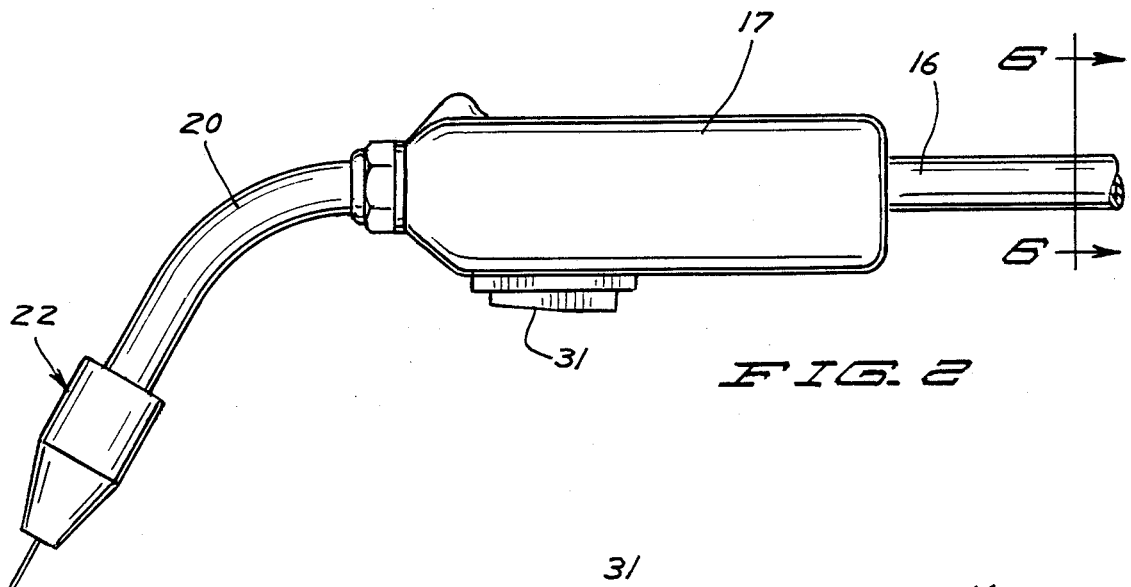
FIG. 2 is a broken view in side elevation of a detail of structure.
Figure 3:
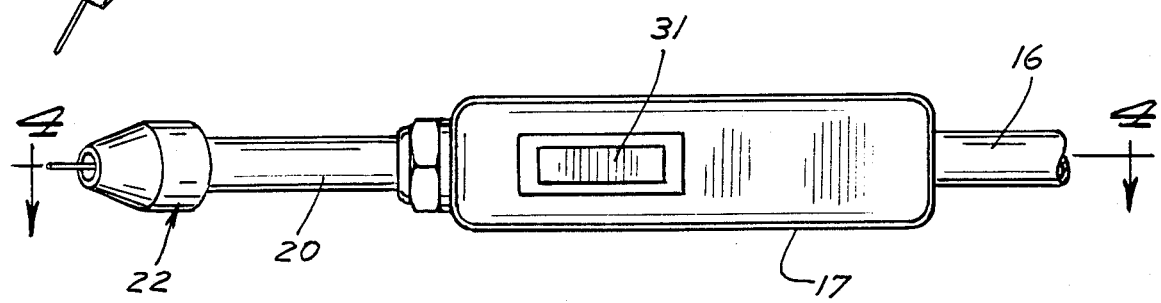
FIG. 3 is a view similar to that of FIG. 2 in bottom plan.

Referring to the drawings, a mig or inert gas welding apparatus or welder is indicated generally by the reference numeral 10. Said apparatus includes a cabinet 12 housing the flux core wire feeding element, the gas and air feeding controls and the electric power control. Said cabinet will be connected with a suitable power source.

Extending from said housing is a flexible cable 15 having adjacent the end 16 thereof an operating handle 17 formed thereabout and suitably secured therein. Extending outwardly of said handle and appropriately secured thereto and forming an operative continuation of said flexible cable 15 is an arcuate extension 20 which has removably secured thereto a nozzle 22 which embodies the essential portion of the invention herein. The outer jacket of said extension may be formed of non-conductive material.

Said nozzle is a removable replacement for a conventional welding tip or nozzle and is threaded onto said rigid extension 20. Said nozzle may be suitably formed of copper or brass and is shown partially insulated at 22e.

The cable 15 is shown having its end portion remote from said cabinet 12 disposed into and secured within said handle 17. Said cable is formed having concentric spaced jackets comprising an outer tubular jacket 16a and an inner jacket 16b. Disposed between said jackets is a current conductor 16c formed of copper wire strands.

Within said inner jacket 16b forming a core therein is a tubular conduit 16d through which is fed from said cabinet 12 a flux core wire or electrode 16e. This electrode is heated for cutting metal and it is formed of a conventional readily available flux core wire. The use of this readily available wire makes unnecessary any reliance on a special core wire which may be difficult to obtain. Referring particularly to the handle portion 17 of FIG. 4, disposed within said handle is a fitting 32 forming a cable connector which operatively connects said cable 15 and the arcuate extension 20. Said fitting or cable connector 32 will be formed of an electrically conductive material.

It is seen that said fitting has a central passage 32a through which passes said conduit 16d and said passage is of sufficient diameter to preserve space for a continuation therethrough of the air passage 16f. The jackets 16a and 16b have their terminal portions as shown disposed about a reduced diameter tubular portion 32b of said fitting and are secured thereto by an annular clamp 36.

Said fitting is configured to have a ramp portion 32c as shown upon which are disposed terminal portions of said copper strands 16c and the same are converged upon in compression holding by the collar 35a of the compression nut 35. Said fitting is enlarged, as seen to the left in FIG. 4, having an inwardly extending threaded recess 32d which has a cap nut 32e enclosing its end portion.

A switch 31 carried by said handle 17 has a conductor 31a in circuit with the wire strand conductor 16c and the switch is operated by its push button 31b.

Referring now to the arcuate extension 20, this comprises an outer insulating jacket 21 which overlies a rigid conductor 33 which has a threaded upper terminal portion 33a threaded into said recess 33d which places it in circuit with said fitting 32. As previously described, extending through said extension is the conduit 16d through which passes the electrode 16e. Said cap nut 32e secures the connection of said extension 20 and said fitting 32.

Adjacent the outer end portion of said arcuate extension 20 and projecting partially therefrom is a fitting 27 of which the rear portion is threaded into the adjacent portion of the rigid conductor 33. Said fitting 27 is tubular and forms an annular chamber 27b about the conduit 16d passing therein and receives an air supply in forming a continuation of the air passage 16f.

Threaded into the free end of said fitting 27 and extending forwardly thereof is a somewhat tapered contact tip 37 having a passage 37a therethrough for the passage of the electrode 16e. Said fitting 37 is in circuit with said conduit 33 and the passage of said electrode 16e through said contact tip is such that there is electrical contact between the two and hence said electrode is effectively in circuit with said contact tip.

As shown, a nozzle 22 forms the terminal portion of said extension 20. Said nozzle comprises a tubular body portion 22a and a tapered nozzle portion 22b which has an outlet 22c. The body portion of said nozzle has a liner 22e integral therewith and having an integral inner threaded insert 22d which is threaded about an adjacent threaded portion 27a of the fitting 27.

Said contact tip 37 extends into the tapered portion of said nozzle somewhat short of the outlet 22c thereof.

A salient feature of the nozzle structure herein is in attaining a sufficiently high velocity of the air stream A as it discharges through the outlet 22c to flush away cut metal. The air passage 16f terminates within the chamber 27b of said fitting 27 blocked by the adjacent end of the contact tip 37. The back pressure of the air stream which develops within this chamber is very substantial.

A restrictive orifice 30 is formed in a forward portion of said fitting 27 as an air outlet for the passage of air under a great velocity from the chamber 27b through the tapered passage 22g within the nozzle tip 22b to discharge through the outlet 22c. The air under pressure discharging through the outlet 22c passes therethrough with considerable velocity and has been measured traveling at a speed of 900 ft./sec. This is ample velocity to flush away cut metal.

Air pressure and electrical power requirements and the speed of advancing the electrode need to be preset and may vary with the particular character of the metal to be cut. The operation is controlled by the switch 31, current passes through the contact tip 37 and through the electrode 16e close to the nozzle opening 22c. The current will be such as to charge the electrode 16e with a metal cutting voltage. The cutting operation is not gouging as in the case of cutting with an arc welder but is a continuous linear cut. The apparatus as described has been found to perform very satisfactorily.

It will of course be understood that various changes may be made in form, details, arrangement and proportions of the parts without departing from the scope of the invention herein which generally stated, consists in an apparatus capable of carrying out the objects above set forth, in the parts and combination of parts disclosed and defined in the appended claims.

What is claimed is:

1. A nozzle structure for cutting metal in connection with a welder cable of an insert gas welder, said nozzle structure comprising a housing having a tapered outlet passage, an electrode passing through said passage, means providing a metal cutting voltage energizing said electrode, means passing air under pressure through said cable and into said nozzle, a chamber in said nozzle receiving said air, a restrictive orifice between said chamber and said outlet passage causing a build-up of back pressure of air in said chamber and causing air acceleration of said air therefrom through said outer passage with sufficient velocity to flush away cut metal.

* * * * *